United States Patent [19]

Furuie et al.

[11] Patent Number: 5,558,310
[45] Date of Patent: Sep. 24, 1996

[54] RADIATOR SUPPORT BRACKET

[75] Inventors: Tsuneichi Furuie; Masato Ueno; Takashi Maeno; Yutaka Ogasawara; Masaki Inoue; Naoki Mori, all of Inazawa, Japan

[73] Assignee: Toyoda Gosei Co., Ltd., Nishikasugai-gun, Japan

[21] Appl. No.: 299,108

[22] Filed: Sep. 2, 1994

[30] Foreign Application Priority Data

Sep. 6, 1993 [JP] Japan ..................... 5-245899
Mar. 18, 1994 [JP] Japan ..................... 6-074429

[51] Int. Cl.⁶ ............................... B60K 11/00
[52] U.S. Cl. .................. 248/573; 248/638; 248/632; 180/68.4
[58] Field of Search .................. 248/232, 233, 248/234, 634, 638, 632, 573, 626; 180/68.4, 68.6

[56] References Cited

U.S. PATENT DOCUMENTS

| | | | |
|---|---|---|---|
| 3,121,467 | 2/1964 | Bryant | 248/232 X |
| 4,564,168 | 1/1986 | Ikuta et al. | 248/638 |
| 4,579,184 | 4/1986 | Hiramoto | 248/232 X |
| 4,742,881 | 5/1988 | Kawaguchi et al. | 180/68.4 |
| 4,770,234 | 9/1988 | Hiraoka et al. | 180/68.6 X |
| 5,355,941 | 10/1994 | Blankenberger et al. | 180/68.4 X |
| 5,435,661 | 7/1995 | Zmyslowski et al. | 180/68.4 X |

FOREIGN PATENT DOCUMENTS

| | | | |
|---|---|---|---|
| 36723 | 3/1983 | Japan | 180/68.4 |
| 161616 | 9/1983 | Japan | 180/68.4 |
| 210126 | 9/1987 | Japan | 180/68.4 |
| 2173459 | 10/1986 | United Kingdom | 180/68.4 |
| 2174655 | 11/1986 | United Kingdom | 180/68.4 |

Primary Examiner—Karen J. Chotkowski
Attorney, Agent, or Firm—Cushman Darby & Cushman

[57] ABSTRACT

A radiator support bracket includes a bracket body and a stopper member. The bracket body is uniformly made of resin and has a plate-like base portion to be fixed to the vehicle frame, a transformable arm portion that extends from the base portion, and a support portion that holds the upper side of the radiator. The stopper member can also be made of resin uniformly with the bracket body.

14 Claims, 7 Drawing Sheets 5,558,310

RADIATOR SUPPORT BRACKET

BACKGROUND OF THE INVENTION

The present application corresponds to Japanese Patent Application No. Hei 5-245899 filed on Sep. 6, 1993 and Japanese Patent Application No. Hei 6-74429 filed on Mar. 18, 1994, which are hereby incorporated by reference into the present application.

1. Field of the Invention

The present invention relates to a bracket, and more particularly, to a radiator support bracket that is used to form a dynamic damper with a radiator as a mass member.

2. Description of the Related Arts

A conventional radiator support bracket is described in U.S. Pat. No. 4,564,168.

FIGS. 14 and 15 herein illustrate such a conventional support bracket that holds a radiator on a vehicle frame elastically, and forms a dynamic damper that uses a radiator as a mass member, and reduces vibration of a front frame of the vehicle.

In FIGS. 14 and 15, radiator R has a protrusion R1 that extends below the radiator and that is coupled to a lower support bracket 4. The lower bracket 4 has a metal base member 41 that is fixed on a front cross member F1 of the vehicle, and a rubber member 42, that covers an opening of the base member 41 and is comparatively thick. The rubber member has a fixing hole at the center in which the protrusion R1 is inserted.

Right and left sides of the upper end of radiator R are held by respective upper support brackets 5. Each upper support bracket 5 has a metal arm portion 52 that extends from a base portion 51, which is fixed to a radiator support member F2, and a metal support plate 53 bent in an inverted U-shape and fixed to the under side of the arm portion 52. The arm portion 52 is bent to accommodate the shape of the metal support plate 53. A comparatively thin rubber member 54 is provided in the support plate 53. A hold plate 55, which has an inverted U-shape, is connected to the rubber member 54, and holds the radiator R along its upper edge portion. Thus, the radiator R is supported elastically on the front cross member F1 and the support member F2 by the upper and lower support brackets 4 and 5, respectively, and operates as a mass member of a dynamic damper to restrict vibration of the front of the vehicle.

However, as the support brackets 4 and 5 have rubber members 42 and 54, many steps such as vulcanized bonding of these members with a metal part, coating of bonding agent, molding by mold, or deburring are required. In addition, the cost of rust-proof coating is high. Therefore, manufacturing cost becomes high.

SUMMARY OF THE INVENTION

It is an object of the present invention to provide a radiator support bracket that has a simple construction and is easy to manufacture.

Another object of the present invention is to provide a radiator support bracket that is manufactured at low cost.

To achieve the foregoing objects, a bracket body is provided that comprises a plate base portion fixed to the body frame, an arm portion that extends therefrom, which may be bent and transformed elastically, and a support portion that is provided at the edge of the arm portion and holds an upper side of the radiator, and they are uniformly made of resin. A hole, where the bolt is inserted, is provided in the base portion, and a metal stopper member, that regulates transformation of the base portion by the bolt, is provided. The stopper member has a wall portion that covers a side portion of the base portion, and the wall portion defines a space between its lower edge and a body frame. Protrusions can be provided at the upper or lower portion of the base portion, or the base portion can be curved a little to the above.

The arm portion, which extends from the base portion, is transformed elastically by a comparatively small spring force, and holds the upper side of the radiator by the support portion that is provided at the edge portion thereof without obstructing the longitudinal movement of the radiator. When the base portion is fixed with the stopper member by a bolt, the base portion is pressed and transformed until the wall portion of stopper member contacts the vehicle frame so that the longitudinal-transformation of the base portion depends on the space between the wall portion and the body frame, and the fixing ability is easily controlled. In a case where the base portion has a protruded portion or curved portion, the base portion is engaged with the stopper member and is transformed so as to crush the protruded portion or push back the curve so that it is easily pressed and fixed.

Besides, as the radiator support bracket uniformly made of resin, many steps such as coating of bonding agent according to the use of rubber member, molding by mold and deburring are not required. In addition, as the rust-proof coating is not required, it is easy and cheap to manufacture.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

Figure 1:
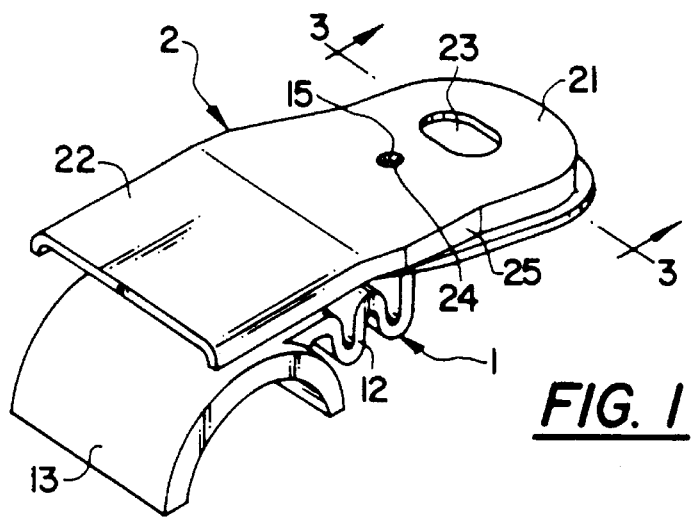
FIG. 1 is a perspective view of a radiator support bracket according to a first embodiment of the/present invention.
Figure 2:
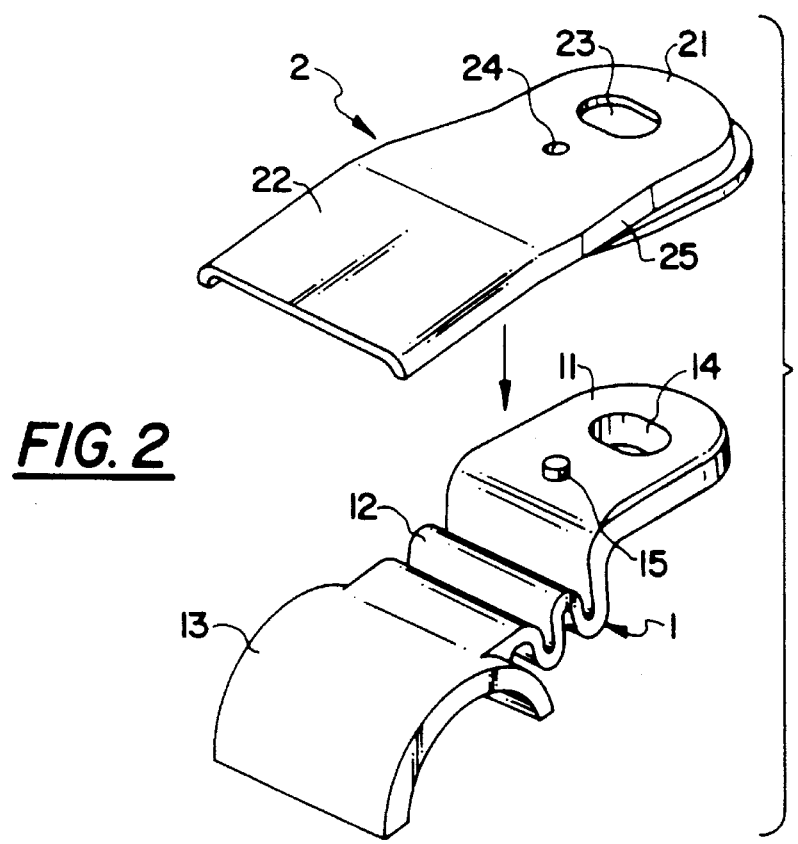
FIG. 2 is an exploded perspective view of a radiator support bracket according to the first embodiment of the present invention.
Figure 3:
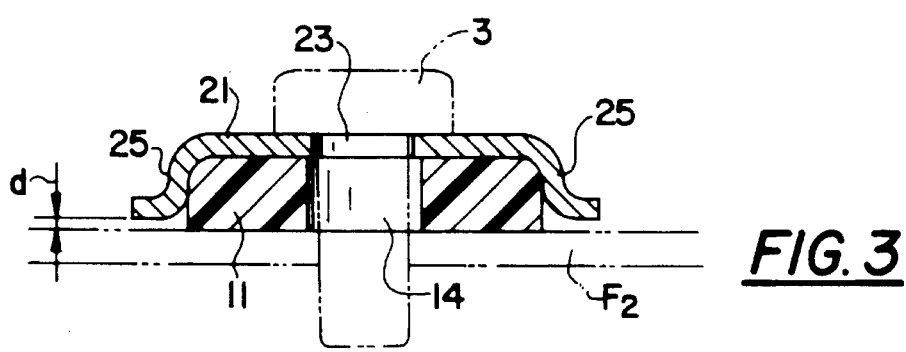
FIG. 3 is a cross-sectional view of a radiator support bracket along line 3—3 in FIG. 1.

FIGS. 1 to 3 illustrate a first embodiment of the present invention, which will be described in detail hereinafter.

Figure 14:
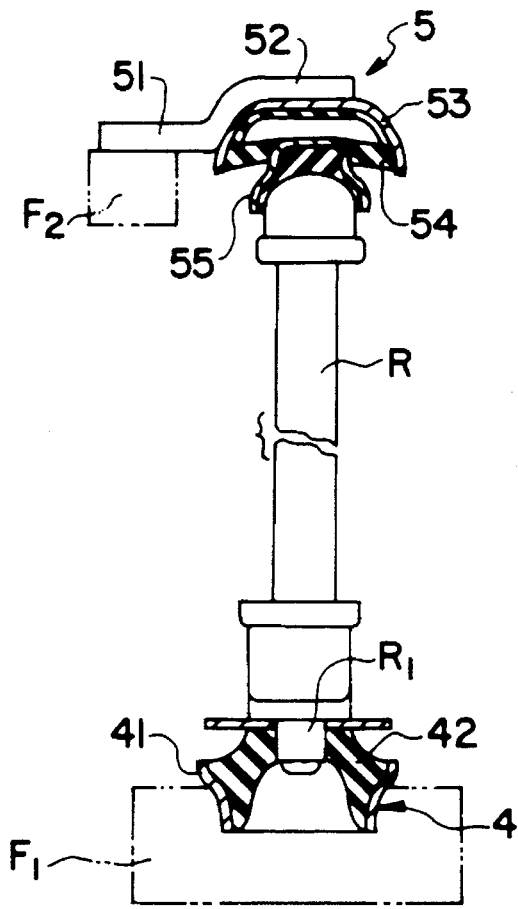
FIG. 14 is a partial cross-sectional view of a conventional radiator support construction.
Figure 15:
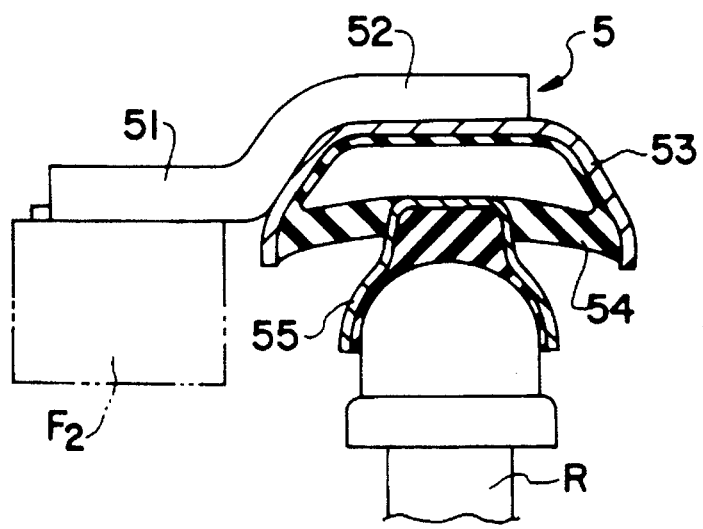
FIG. 15 is a partial enlarged view of FIG. 14.

A bracket body 1 is uniformly made of polyamide resin, and a metal stopper member 2 is provided so as to cover the bracket body 1. The bracket body 1 comprises a plate-like base portion 11, an arm portion 12 that extends therefrom bending in a wave-like fashion, and a curved or arched support portion 13. The base portion 11 has a hole 14 at a center thereof and in which a bolt may be inserted and a positioning protrusion 15 in the surface of the base portion 11. The inner face of the curved support portion 13 holds a radiator R (FIG. 14) along an upper edge thereof.

The stopper member 2 is made from metal plate by a press, and comprises a base portion 21 that has the same shape as the base portion 11 of the bracket body 1, and a stopper portion 22 that extends to the edge of the bracket body 1. The stopper member 2 has a hole 23 at the center of the base portion 21, and a positioning hole 24 near the hole 23. An outer flange surrounding the stopper member 2 is bent downward so as to form a wall portion 25. The wall portion 25 is positioned along the outer circumference of the base portion 11. The edge of the wall portion 25 is bent out and defines a space "d" between the radiator support member F2 where the base portion 11 is attached.

The stopper member 2 is disposed on the bracket body 1 as shown in FIG. 2, and the positioning hole 24 is engaged to the positioning protrusion 15 as shown in FIG. 1. Then, a bolt 3 is inserted into the holes 14 and 23, and fixed to a radiator support member F2. The base portion 11 of the bracket is deformed by the bolt 3. The deformation of base portion 11 in a direction parallel to a longitudinal axis of bolt 3 is limited by the distal edge of the wall portion 25 contacting the radiator Support member F2, and the deformation of base portion 11 in a direction perpendicular to the longitudinal axis of bolt 3 is limited by its contact with the wall portion 25. As the fixing force to the base portion 11 is limited by the existence of the wall portion 25, the pressing force to the resin material is restricted by the space "d" and the proper fixing ability is obtained by pressing the bracket until the under edge of the wall portion 25 is attached to the radiator support member F2. The transformation of the resin material ensures that the base portion 11 of the bracket body is not shaky in the stopper member 2.

When the radiator R vibrates, the bracket body 1 holds the radiator R by the arched support portion 13, and the arm portion 12 transforms following the vibration of the radiator R with a comparatively small spring force so that the operation of the radiator R as a mass member of a dynamic damper is not obstructed. In this case, the arm portion 12 is bent in wave-shape so that the stress at transformation is small, and has sufficient durability. When the radiator R vibrates excessively, the support portion 13 of the bracket body 1 contacts the stopper portion 22 of the stopper member 2 and restricts the displacement of support portion 13.

According to this embodiment, the metal stopper member 2 is easy to rust-proof by metal plating before assembling, and a rubber member is not used. Thus, the manufacturing cost for such processes as vulcanization or deburring is not required.

Figure 4:
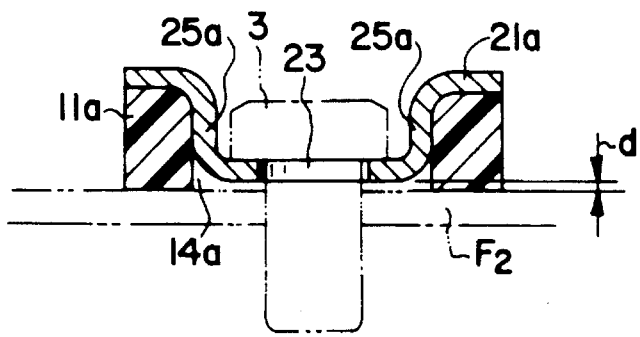
FIG. 4 is a cross-sectional view of a base portion of a radiator support bracket according to a second embodiment of the present invention.

FIG. 4 illustrates a second embodiment of the present invention, which will be described in detail hereinafter.

In this embodiment, the base portion 11a of the bracket body 1b has a hole 14a, which has a large diameter, and a center of the base portion 21a of the stopper member 2 has a hollow shape and engages with hole 14a. A wall portion 25a is bent along the hole 14a, and restricts the longitudinal transformation of the base portion 11. The bottom portion of the base portion 21a of the stopper member defines a space "d" between the radiator support member F2.

Figure 5:
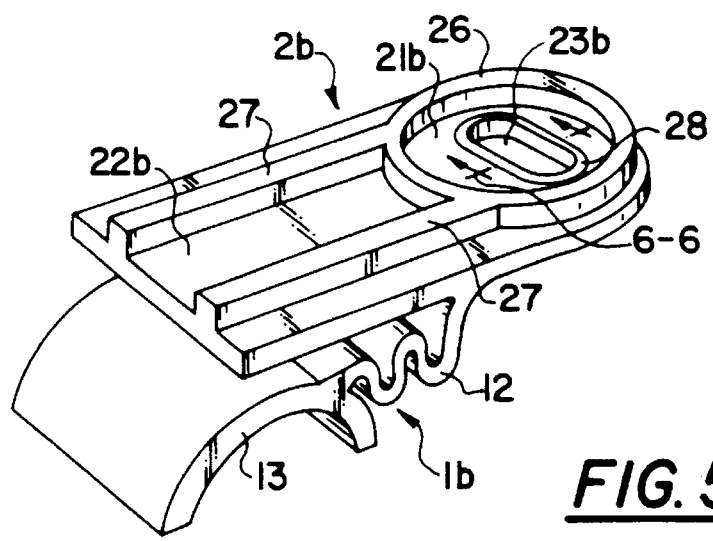
FIG. 5 is a perspective view of a radiator support bracket according to a third embodiment of the present invention.
Figure 6:
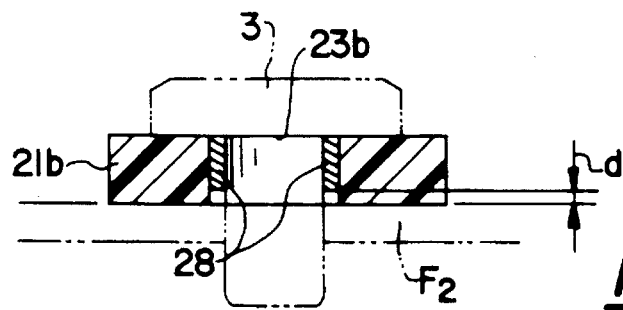
FIG. 6 is a cross-sectional view of a radiator support bracket along line 6—6 in FIG. 5.

FIGS. 5 an 6 illustrate a third embodiment of the present invention, which will be described in detail hereinafter.

A bracket body 1b has the same shape as the first embodiment, and a stopper member 2b is uniformly made of resin, for example, polyamide. Body 1b is also made of resin, for example, polyamide. The stopper member 2b has a circular reinforcing rib 26 along an upper surface of the base portion 21b, and straight reinforcing ribs 27 that extend from the reinforcing rib 26 horizontally on the stopper portion 22b. An arm portion 12, which is bent in a wave-shape, extends from an under side of the stopper member 26, and a curved support portion 13 is provided at the end of the arm portion 12. The base portion 21b of the stopper member 26 (and the bracket body 1b) has a hole 23b at the center, in which a bolt may be inserted. A metal tubular collar 28 is coupled to the inner wall of hole 23b. The under edge of the collar 28 defines a space "d" between the radiator support member F2, and limits the longitudinal transformation of the base portion 21.

According to this embodiment, there is no need to form the stopper member separately, to provide a rust-proof coating, or to assemble separate pieces so the manufacturing cost is reduced. Besides, the bracket is made of resin so that the whole weight of the radiator bracket is decreased.

Figure 7:
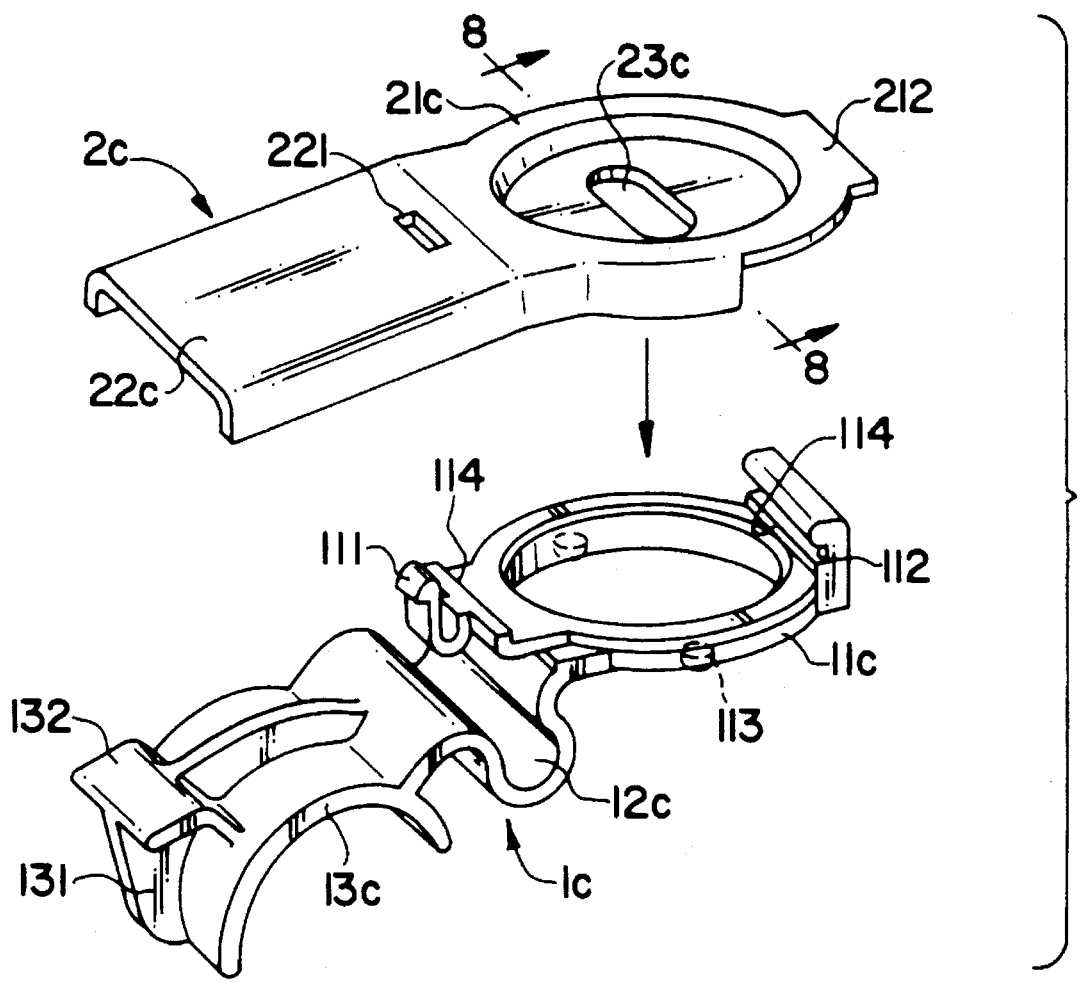
FIG. 7 is an exploded perspective view of a radiator support bracket according to a fourth embodiment of the present invention.
Figure 8:
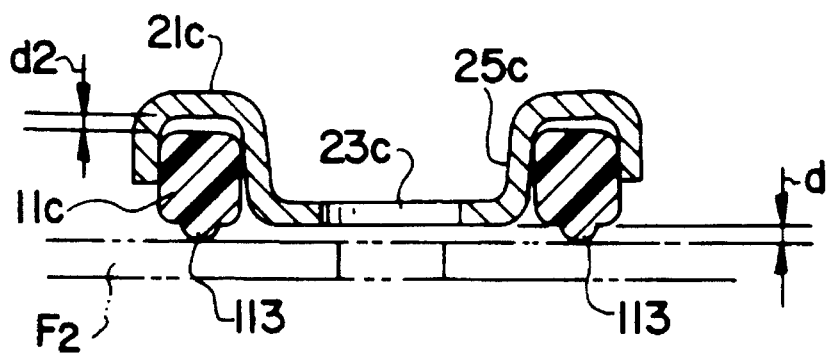
FIG. 8 is a cross-sectional view of a radiator support bracketed along line 8—8 in FIG.
Figure 9:
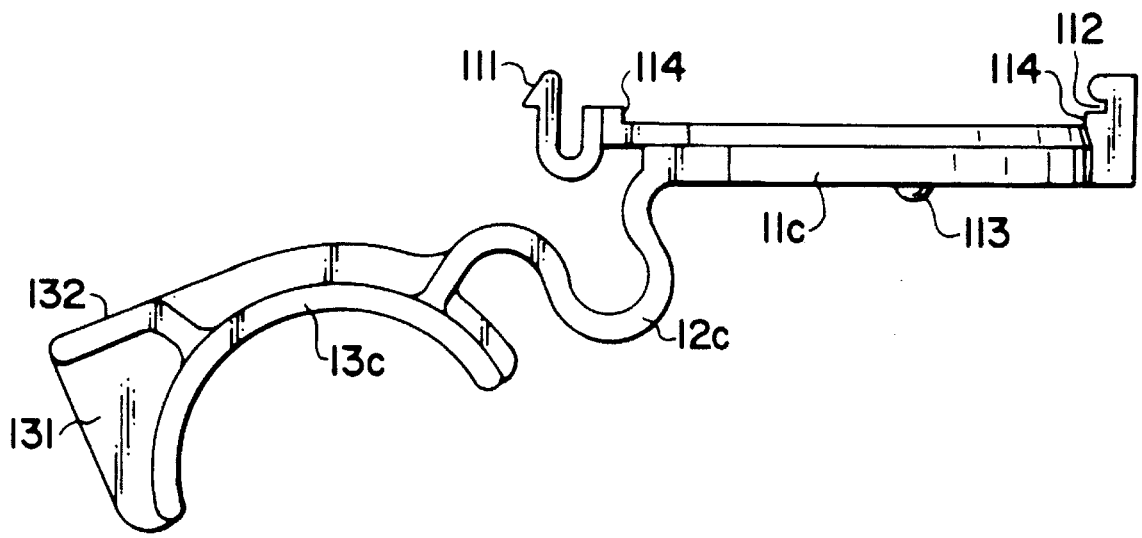
FIG. 9 is a side view of a bracket body according to the fourth embodiment of the present invention.

FIGS. 7 to 9 illustrate a fourth embodiment of the present invention, which will be described in detail hereinafter.

A base portion 11c of the polyamide resin bracket body 1c is circular-shaped, and has an arm portion 12c that extends therefrom bending in a wave shape, and a curved support portion 13c. A stopper member 2c comprises a circular base portion 21c, that has the same shape as the base portion 11c, and a plate-like stopper portion 22c. The middle of the base portion 21c is sunk in a circular shape, and sized so as to fit inside the base portion 11c, and has an elliptical hole 23c at the center where the bolt is inserted. The stopper member 2c is fixed to the bracket body 1c by engaging the base portion 21c to the base portion 11c of the bracket body 1c and tightening the bolt that is inserted in the hole 23c. The outer face of the base portion 21c of the stopper member 2c is bent along the base portion 11c of the bracket, and forms a wall portion 25c that restricts the longitudinal transformation of the base portion 11c. The edge of the wall portion 25c is bent in an inverted U-shape along the base portion 11c, and holds the upper side of the base portion 11c.

The base portion 11c has a bulge that has substantially the same width as an arm portion 12. A fixing member 111, which bends in a U-shape and has a claw at the tip, is provided at the end of the bulge. The opposite side of the fixing member 111 bulges to the outside and is thick and has a groove 112 at the inner wall. A flange 212 is formed at the end of the base portion 21c, and the stopper member 22 has a fixing hole 221. When the stopper member 2c is located on the bracket body 1c, the fixing member 111 engages the fixing hole 221, and the flange 212 engages the groove 112.

A rib 131 is provided on the upper surface of the radiator support portion 13c, and a plate-like stopper 132 is provided around the center thereof. When a strong force in a back and forth direction of the car is given to the bracket body 1c, for example, when the car starts or stops suddenly, the radiator R rotates. When the rotation of the radiator R is hard, the radiator may come off of the radiator support portion 13c. The stopper 132 restricts the displacement of the radiator support portion 13c by contacting the under side of the stopper portion 22c. Plural protrusions 113 are provided on the under surface of the base portion 11c, and a step portion 114 is disposed on the upper side of the base portion along the groove 112 and on the base end portion of the fixing member 111. The under side of the base portion 11c has protrusions 113 so that a space "d2" is defined between the base portion 21c of the stopper member and the base portion 11 of base portion 1. The space "d2" is same height as the step portion 114 and is smaller than the space "d". When the stopper member 2c is located on the base portion 1c and is fixed by bolt, deformable protrusions 113 are deformed and compressed until the under face of the base portion 21c is attached to the radiator support member F2.

According to this embodiment, the base portion of the bracket body has a circular shape, and the base portion 11c is engaged to the base portion 21c so that it prevents the bracket body 1c from slipping by transformation of the resin material. The base portion may not only have a circular shape, but also may have a shape that has no opening at the surrounding portion and holds the stopper member 2c.

Because it is hard to compress a thin resin material in certain quantity, the bracket body 1c has the protrusions 113, that are easy to transform so that fixing by bolt is easy and a high fixing ability may be obtained. When the protrusions 13 are compressed, a little space around the protrusions 113 remains. Further movements of stopper member 26 relative to base portion 11c is possible due to the space "d" provided by the existence of the step portion 114 between the base portion 21c of the stopper member and the base portion 11c of the bracket body so that vibration of the bracket body is prevented. Further, since the fixing member 111 and the groove 112 of the base portion 11c are engage to the fixing hole 221 and the flange 212 of the stopper member 2c, assembling is easy and prevents the bracket body 1c from rotating.

Figure 10:
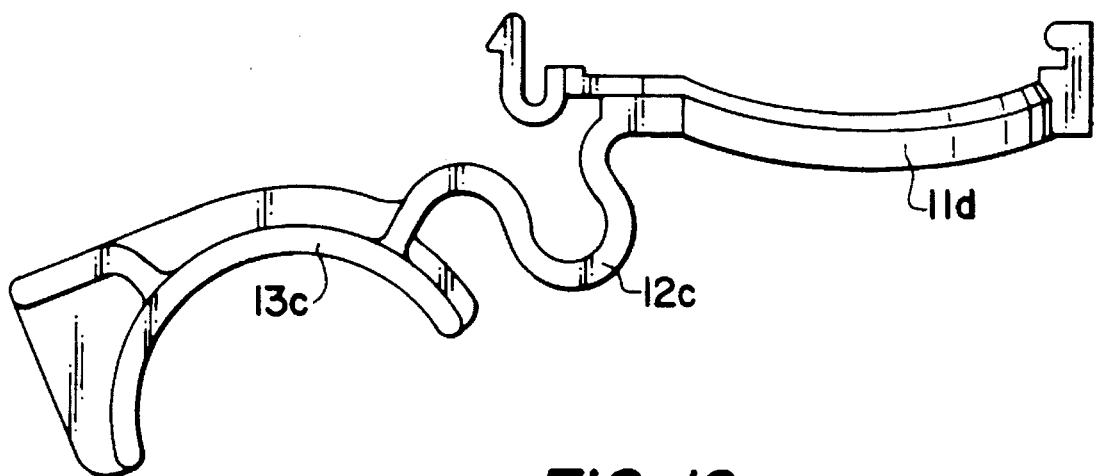
FIG. 10 is a side view of a bracket body according to a fifth embodiment of the present invention.

FIG. 10 illustrates a fifth embodiment of the present invention, which will be described in detail hereinafter. The bracket body illustrated in FIG. 10 is also made of a resin, for example polyamide.

The same result of providing the above mentioned protrusions 113 and/or the step portions 114 may be obtained by bending the base portion in an upper curve shape. When the base portion 21c of FIG. 7 is located on the base portion 11d and is fixed by a bolt, the base portion is transformed so as to straighten the curve. This transformation occurs easily, and a high fixing ability is obtained.

Figure 11:
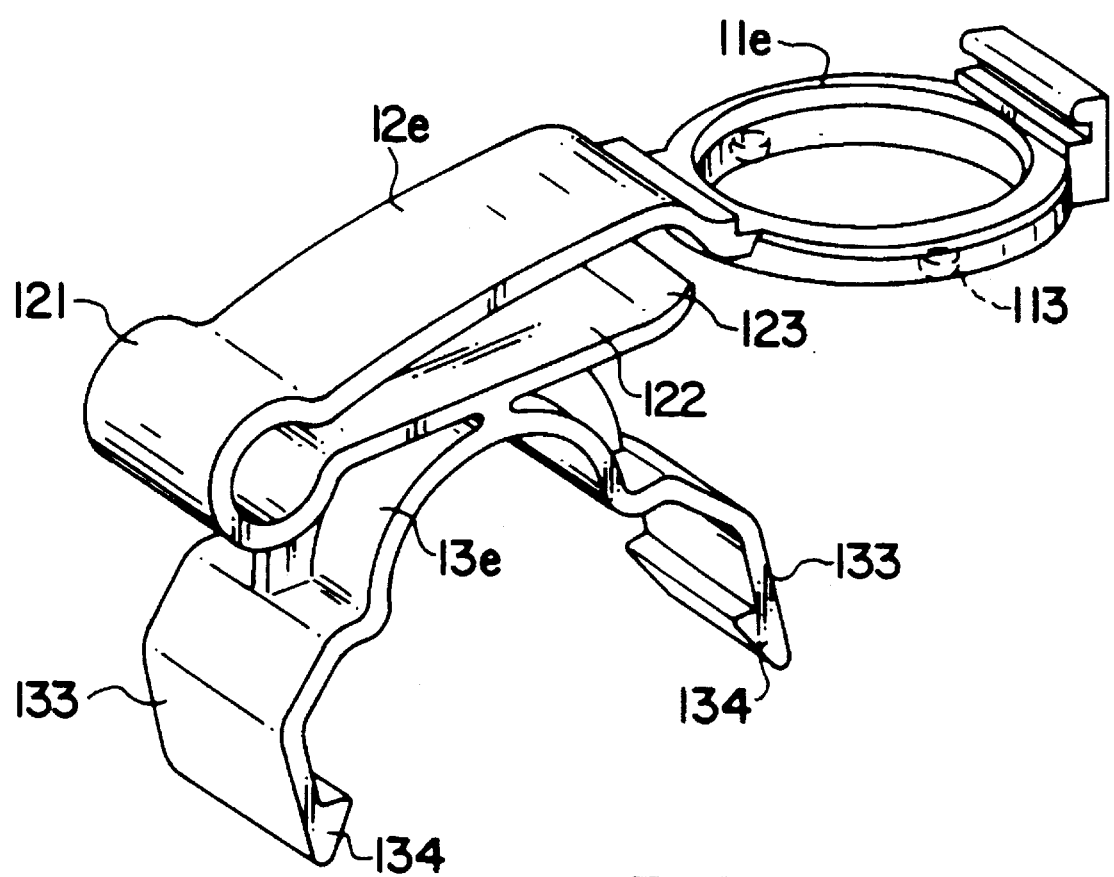
FIG. 11 is a perspective view of a bracket body according to a sixth embodiment of the present invention.
Figure 12:
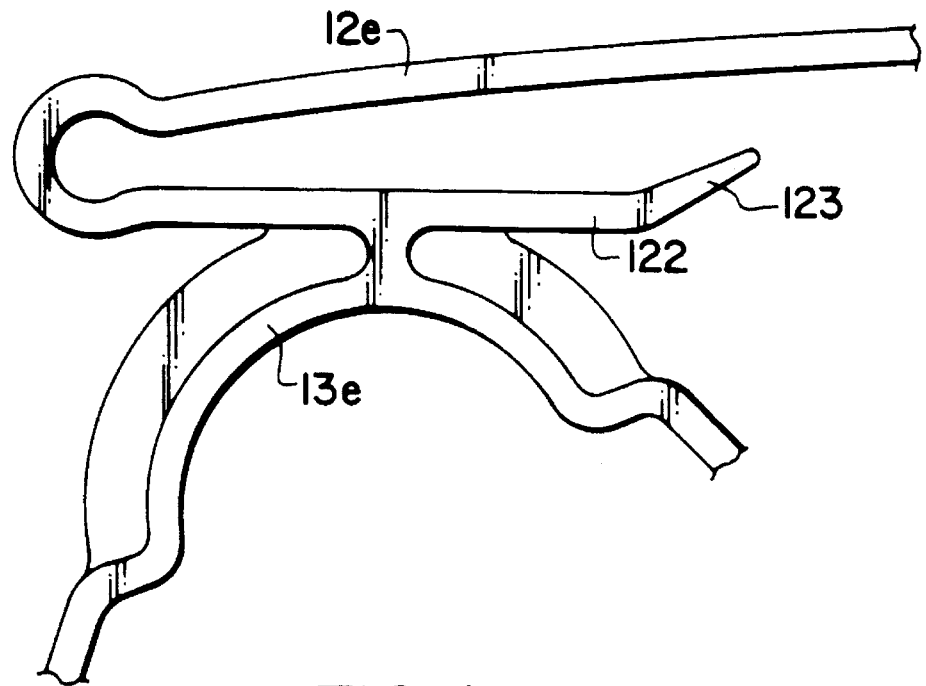
FIG. 12 is a partial side view of a bracket body according to the sixth embodiment of the present invention.
Figure 13:
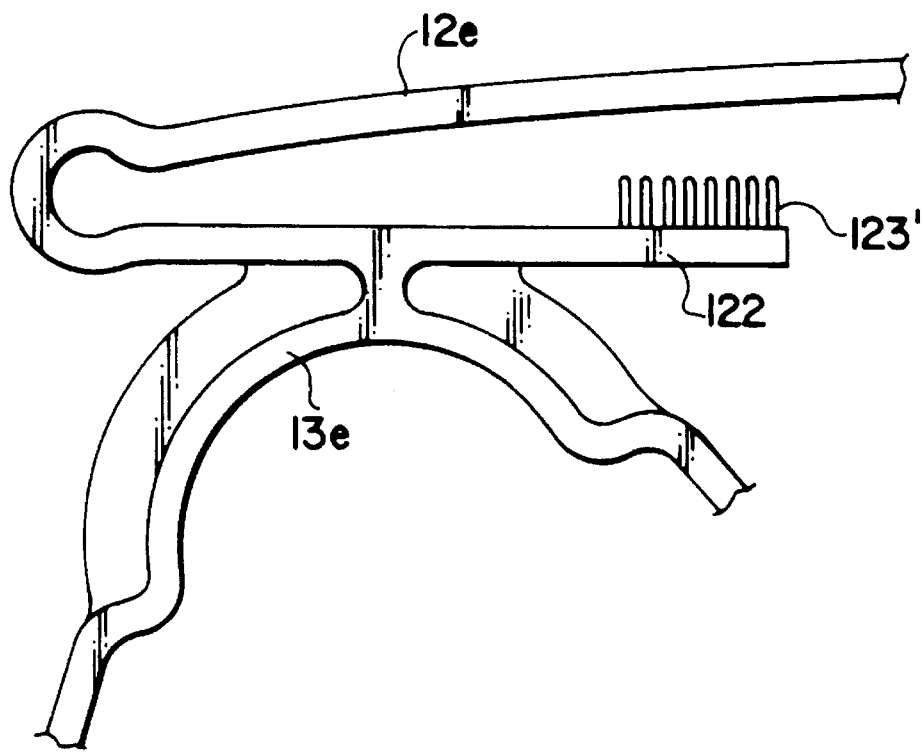
FIG. 13 is a partial side view of a bracket body of another example according to the sixth embodiment of the present invention.

FIGS. 11 to 13 illustrate a sixth embodiment of the present invention, which will be described in detail hereinafter. The bracket body of this embodiment is also made of a resin, for example polyamide.

The base portion 11e has the same configuration as the fourth embodiment, and a plate spring-like arm portion 12e extends therefrom. The arm portion 12e is bent substantially in an U-shape at the middle, and the bent middle portion 121 acts as a transformation fulcrum of the spring. The end portion of the arm portion 12e extends to the base portion 11c from the middle portion 121, and a circular radiator support position 13e is connected to the under face of the end portion 122. When the radiator vibrates, the end portion 122 is deformed, and the vibration is reduced.

Right and left side portions 133 of the radiator extend below curved portion 13e and spreads out to the sides, so that it may support the upper and side portions of the radiator more steadily. Claws 134 are provided at the inner side of the right and left side portions 133. The edge portion of the end portion 122 includes a shock absorbing member 123 that thins gradually (FIG. 11) and is bent slightly. When the vibration is large, the end portion 122 may make noise by contacting the under face of the upper arm portion 12e. The shock absorbing member 123 lightens the shock to the arm portion 12e and prevents such noise. The shock absorbing member 123 instead may be brush that has a lot of protrusions 123' on the upper face thereof. See FIG. 13.

According to this embodiment, since the transformation fulcrum is provided at the opposite side of the base portion 11c, when force in a back and forth direction (in case of a starting point) is given to the bracket, the radiator support portion 13e does not slip, and holds the radiator strongly. Besides, the claws 134 are disposed at the both ends of the side portion 133 so that the radiator support bracket holds the radiator more firmly.

The protrusion 113, the shock absorbing member 123 or the stopper 132 could be used by itself or combined with the other embodiments. For example, when the shock absorbing member 123 in the sixth embodiment is used in the fourth embodiment, the shock absorbing member 123 is provided on the stopper 132.

Besides, when significant vibration of the radiator R is not a serious problem, i.e., significant vibrations rarely occur, only the base portion 21 of the stopper member 2 need be provided.

While the invention has been described with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A radiator support bracket holding an upper side of a radiator comprising:

a bracket body uniformly made of resin, said bracket body including a base portion adapted to be fixed to a vehicle body, a transformable arm portion extending from said base portion, and a support portion provided at an edge of an end of said arm portion and holding the upper side of the radiator, and a stopper member for restricting transformation of said base portion, wherein said transformable arm portion has a wave-shape.

2. A radiator support bracket holding an upper side of a radiator comprising:

a bracket body uniformly made of resin, said bracket body including a base portion adapted to be fixed to a vehicle body, a transformable arm portion extending from said base portion, and a support portion provided at an edge of an end of said arm portion and holding the upper side of the radiator, and a stopper member for restricting transformation of said base portion, wherein said bracket body and said stopper member are integrally formed from a resin, and a metal collar is provided around walls of said base portion defining a hole, and wherein said stopper member has a reinforcing rib thereon.

3. A radiator support bracket holding an upper side of a radiator comprising:

a bracket body uniformly made of resin, said bracket body including a base portion adapted to be fixed to a vehicle body, a transformable arm portion extending from said base portion, and a support portion provided at an edge of an end of said arm portion and holding the upper side of the radiator, and a stopper member for restricting transformation of said base portion, wherein said base portion has a circular shape.

4. A radiator support bracket holding an upper side of a radiator comprising:

a bracket body uniformly made of resin, said bracket body including a base portion adapted to be fixed to a vehicle body, a transformable arm portion extending from said base portion, and a support portion provided at an edge of an end of said arm portion and holding the upper side of the radiator, and a stopper member for restricting transformation of said base portion, wherein said base portion has a circular shape and includes deformable protrusions on an under surface thereof.

5. A radiator support bracket according to claim 4, wherein said base portion is formed in a curved shape.

6. A radiator support bracket holding an upper side of a radiator comprising:

a bracket body uniformly made of resin, said bracket body including a base portion adapted to be fixed to a vehicle body, a transformable arm portion extending from said base portion, and a support portion provided at an edge of an end of said arm portion and holding the upper side of the radiator, and a stopper member for restricting transformation of said base portion, wherein said arm portion is substantially U-shaped, and a curved portion thereof defines a spring portion.

7. A radiator support bracket according to claim 6, wherein said arm portion includes a plate-like shape as a shock absorbing member at an end thereof.

8. A radiator support bracket according to claim 6, wherein said arm includes support portions that include claws on both ends of said side portions of said support portions.

9. A radiator support bracket according to claim 6, wherein said arm portion includes a brush that acts as a shock absorbing member.

10. A radiator support bracket for holding an upper side of a radiator comprising:

a bracket body uniformly made of resin, said bracket body including a base portion constructed and arranged to be fixed to a vehicle body, a transformable arm portion extending from said base portion, and a support portion provided at an edge of an end of said arm portion constructed and arranged to be attached to the upper side of the radiator, and a stopper member for restricting transformation of said base portion, wherein said transformable arm portion has a wave-shape.

11. A radiator support bracket for holding an upper side of a radiator comprising:

a bracket body uniformly made of resin, said bracket body including a base portion constructed and arranged to be fixed to a vehicle body, a transformable arm portion extending from said base portion, and a support portion provided at an edge of an end of said arm portion constructed and arranged to be attached to the upper side of the radiator, and a stopper member for restricting transformation of said base portion, wherein said bracket body and said stopper member are integrally formed from a resin, and a metal collar is provided around walls of said base portion defining a hole, and wherein said stopper member has a reinforcing rib thereon.

12. A radiator support bracket for holding an upper side of a radiator comprising:

a bracket body uniformly made of resin, said bracket body including a base portion constructed and arranged to be fixed to a vehicle body, a transformable arm portion extending from said base portion, and a support portion provided at an edge of an end of said arm portion constructed and arranged to be attached to the upper side of the radiator, and a stopper member for restricting transformation of said base portion, wherein said base portion has a circular shape.

13. A radiator support bracket for holding an upper side of a radiator comprising:

a bracket body uniformly made of resin, said bracket body including a base portion constructed and arranged to be fixed to a vehicle body, a transformable arm portion extending from said base portion, and a support portion provided at an edge of an end of said arm portion constructed and arranged to be attached to the upper side of the radiator, and a stopper member for restricting transformation of said base portion, wherein said base portion has a circular shape and includes deformable protrusions on an under surface thereof.

14. A radiator support bracket for holding an upper side of a radiator comprising:

a bracket body uniformly made of resin, said bracket body including a base portion constructed and arranged to be fixed to a vehicle body, a transformable arm portion extending from said base portion, and a support portion provided at an edge of an end of said arm portion constructed and arranged to be attached to the upper side of the radiator, and a stopper member for restricting transformation of said base portion, wherein said arm portion is substantially U-shaped, and a curved portion thereof defines a spring portion.

* * * * *